Figure 3:
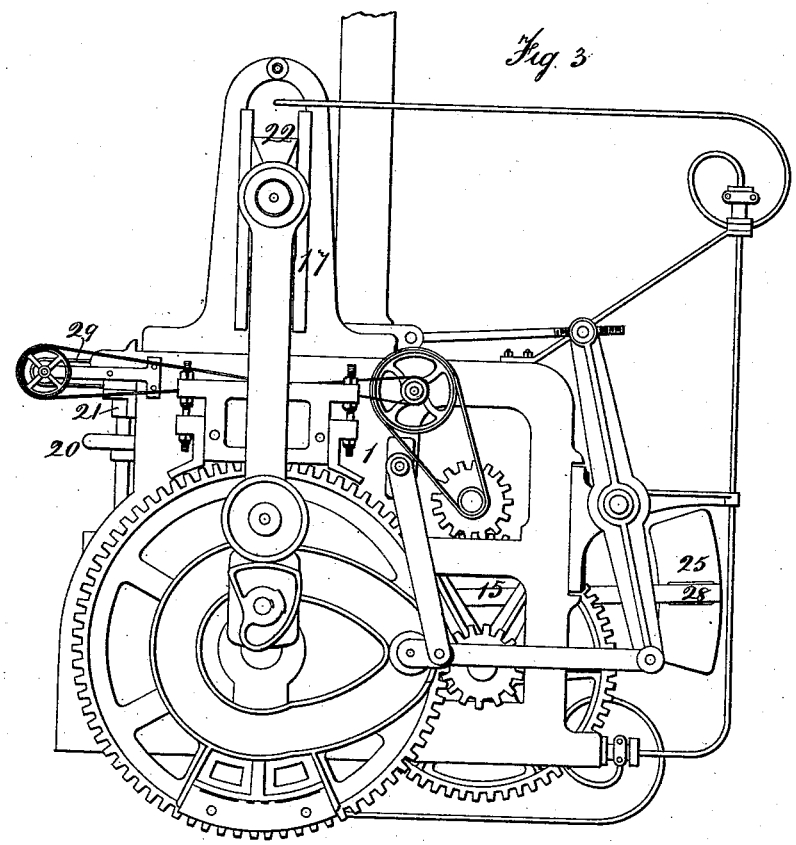

(No Model.)
2 Sheets—Sheet 1.
T. WHITTAKER.
BRICK PRESS.
No. 566,105.  Patented Aug. 18, 1896.
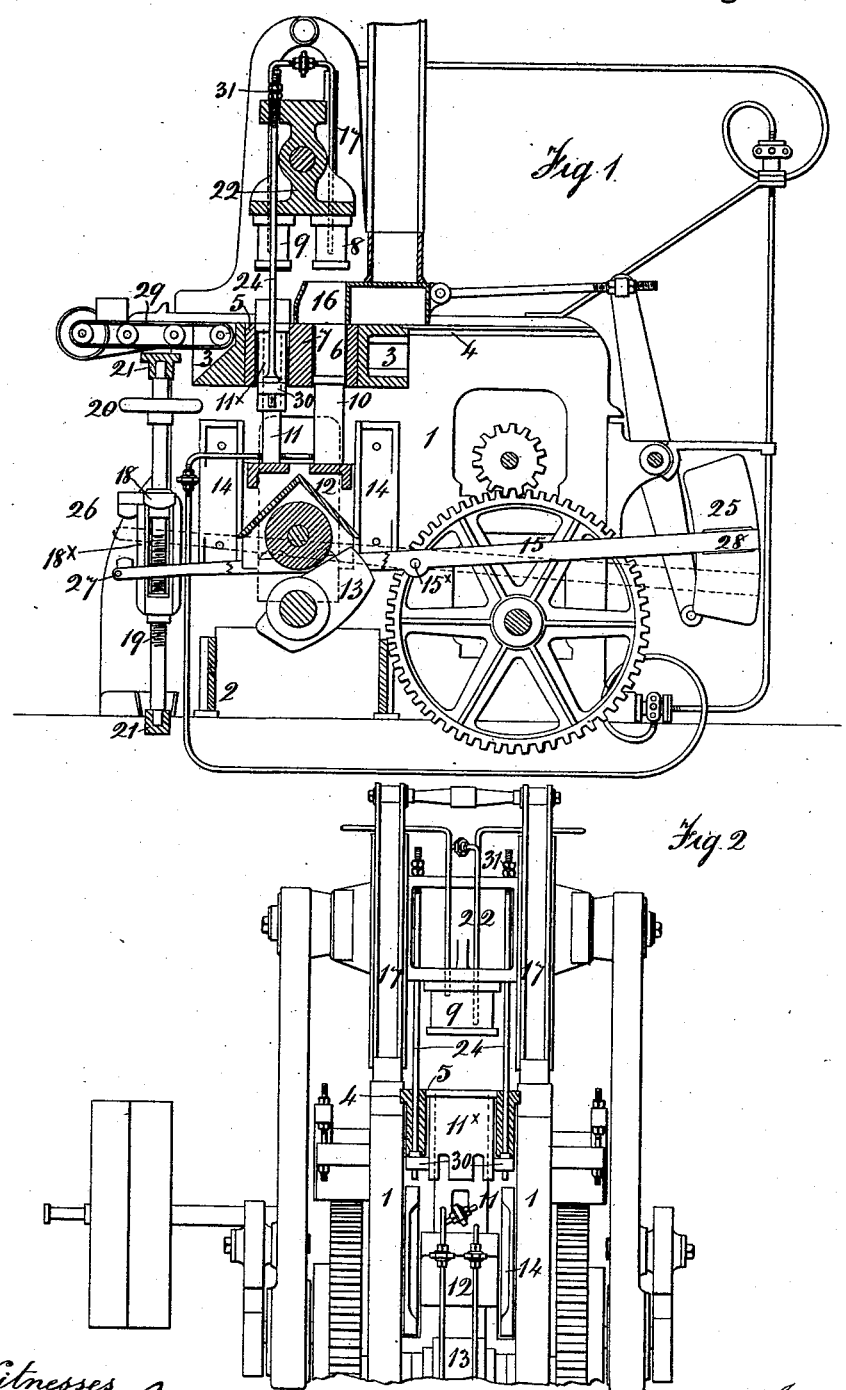
Witnesses
JW Clayton
Inventor
Thomas Whittaker (No Model.)

T. WHITTAKER.
BRICK PRESS.

No. 566,105. Patented Aug. 18, 1896.

2 Sheets—Sheet 2.

Witnesses

Inventor
Thomas Whittaker

UNITED STATES PATENT OFFICE.

THOMAS WHITTAKER, OF ACCRINGTON, ENGLAND.

BRICK-PRESS.

SPECIFICATION forming part of Letters Patent No. 566,105, dated August 18, 1896.

Application filed November 8, 1893. Serial No. 490,355. (No model.) Patented in England April 12, 1893, No. 7,456.

*To all whom it may concern:*

Be it known that I, THOMAS WHITTAKER, a subject of the Queen of Great Britain, and a resident of Accrington, in the county of Lancaster, England, have invented a new and useful Improvement in Brick-Presses, (for which I have obtained Letters Patent of Great Britain, No. 7,456, dated the 12th day of April, 1893;) and I do hereby declare the following to be a full, clear, and exact description thereof.

Figure 1 is a vertical longitudinal section, Fig. 2 is an end view, part being in section, and Fig. 3 is a side elevation, of a brick-press constructed in accordance with my invention.

The press is of the well-known class in which bricks are formed from pulverulent, semidry, or plastic materials by means of pressure-molds. Bricks so made have, however, the disadvantage that they are apt when burned to be more or less porous or absorbent of moisture to an undesirable degree.

It has been found in practice that if such bricks formed by pressure in molds are again subjected to pressure in a second mold before being burned they come out of the kilns with a hard impervious surface, which practically prevents the absorption of moisture.

1 are the side frames of the press, which are held in position and framed together by the struts 2 and mold-cheeks 3. On the inside of the said frames 1 at the top are grooves 4, into which the pieces forming the molds fit. The said molds are formed of separable plates and blocks, which may be readily taken apart and replaced when either by reason of wear or otherwise it is desirable to do so. The second or re-pressing mold 5 is placed directly in front of the first or forming mold 6, from which it is divided by a mid-feather or septum 7. The said septum 7, like the other parts of the mold, is made with liners in the usual way, so as to allow of repair without entire replacement.

The first or forming mold 6 is slightly less in cross-sectional area than the second or re-pressing mold 5, so as to allow the brick ejected from the said mold 6 to drop into the mold 5 for re-pressure. The top plunger 8, which works in the mold 6, is slightly shorter than the top plunger 9, which works in the mold 5, so that the mold 6 is greater in cubic contents than the mold 5 and the brick coming out of the forming-mold 6 is slightly larger than the brick when it has been re-pressed in the mold 5, and extra pressure is thereby obtained in the re-pressing mold. These two molds might for convenience and cheapness be cast all in one piece, with thin liners on the wearing-faces instead of being built up as shown.

The two top plungers are attached to the cross-head 22, which moves in the slides 17. The movement of these two top plungers is simultaneous, as they are both attached to one and the same cross-head. The pressure on the brick on the under side is derived from the drop-box 12, which is actuated by a cam 13.

The lower plunger 10 of the forming-mold 6 is in one piece, but the plunger of the re-pressing mold 5 is in two pieces—namely, a central block 11, which is attached to the drop-box 12, and a casing $11^\times$, which envelops and slides over the central block 11. The casing $11^\times$ is held up level with the table by the rods 24, one on each side of the mold, until the brick made in mold 6 is pushed by the feed-carriage 16 onto the said casing $11^\times$, after which the said brick sinks along with the said casing $11^\times$ as the cross-head 22 falls.

The block 11, which indents the lower side of the brick and which is attached to the drop-box 12, sinks down by action of the cam 13 on the said drop-box 12 preparatory to the mold 6 being charged with pulverulent material by the feed-carriage 16. In this way said block 11, which would otherwise project from the face of the casing $11^\times$ and prevent the brick just re-pressed from being pushed forward, as well as the brick from the mold 6 from being placed in position for re-pressure, is withdrawn out of the way.

When the movement of the cross-head 22, from which the casing $11^\times$ is freely suspended by the rods 24, has allowed the casing $11^\times$ to fall down onto the drop-box 12, the said parts 11 and $11^\times$ act together as one entire piece during the pressing period and simultaneously with the plunger 10. Both the top and bottom plungers of both molds are heated by steam, which circulates through the entire system, as is now well known. 15 is a lever pivoted at $15^\times$, on which the drop-box 12 rests during the period of the filling of the mold 6 with pulverulent material by the feed-carriage 16. The position of one end, 27, of the said lever 15 is regulated by the screw 19 and hand-wheel 20, which act on a buffer 26, forming part of a nut 18, engaging with the said screw 19. 18× are guides for the nut to prevent its turning on the said screw 19. As the buffer is raised or lowered more or less motion is allowed to the lever 15. 25 is a weight placed on the other end, 28, of the lever 15 to act as a counterpoise to the drop-box 12.

By raising or depressing the said lever 15, so as to allow the plunger 10 to fall a greater or less distance, more or less material is taken into the first mold 6, and so the density of the finished brick may be regulated to the varying material used. The upper and lower plunger-faces are always, when finishing pressing, the same distance apart, so that the density of the bricks may be varied while dimensions remain constant.

The feed-carriage 16 in bringing up a charge of pulverulent material for the mold 6 pushes forward onto the face-piece 11× the brick which would at this period be standing on the face of the plunger 10 level with the table. This brick in its turn pushes forward the re-pressed brick standing on the face-piece 11×. On account of the feed-carriage 16 only just delivering the brick from mold 6 onto the casing 11× the brick in front would not be sufficiently clear of the descending plunger 9. For the purpose of overcoming this the endless traveling belt 29 is used. The finished brick is pushed by the brick behind it far enough for the belt to get hold of it. This belt then carries it forward. 14 are adjustable slides, in which the drop-box 12 moves up and down. 21 is a base for carrying the regulating-screw 19. The casing 11× has projections 30, to which the upright rods 24 are attached. These rods pass freely up through holes in the end blocks of the mold and through the cross-head 22. On the upper end of these rods are one or more nuts 31, against which the cross-head acts when in motion and by which the casing 11× of the plunger is suspended. By means of the nuts 31 the upper face of the part 11× may be adjusted to the level of the table, in order to receive and deliver the bricks to and from the re-pressing mold without damage.

The driving-gear and steam connections are of any usual construction arranged in any suitable way. One press may operate two or more pairs of molds.

I claim—

1. In a brick-machine, two molds in close proximity, mechanism for feeding pulverulent material to the first mold, mechanism for feeding the brick from the first mold to the second, two sets of plungers for each mold, and means for actuating all the plungers, from opposite directions simultaneously toward an intermediate position in the molds, whereby the bricks are pressed and re-pressed from both sides, all combined substantially as described.

2. In a brick-pressing machine, the combination of the two molds in close proximity, the second mold being of the greater cross-sectional area, means for feeding pulverulent material to the first mold, means for pressing the brick in the first mold and for conveying it immediately to the second mold, and means for pressing the brick in the second mold to a larger cross-sectional area and less thickness than in the first mold, all combined substantially as described.

3. In a brick-pressing machine, the combination of the two molds, the second mold being of the greater cross-sectional area, means for feeding pulverulent material to the first mold and means for feeding bricks from the first mold to the second mold, suitable support for the bricks in each mold, and a cross-head with plungers of unequal length attached, said plungers actuated by the cross-head to press the bricks in both molds simultaneously, substantially as described.

4. In a brick pressing and re-pressing machine, a stationary mold, a top plunger and a bottom plunger and mechanism for actuating these plungers simultaneously toward an intermediate position in the mold, means for lifting the brick from the mold and means for feeding the brick forward to a second mold in proximity to the first, and a top plunger and bottom plunger actuated simultaneously to re-press the brick to a lesser thickness in the second mold, all combined substantially as described.

5. In a brick-pressing machine, a mold, a top plunger to said mold, and a bottom plunger composed of two parts both of which enter the mold and means for moving one part of said plunger downward and out of the mold, while the other part remains in the mold, all combined substantially as described.

6. In a brick-pressing machine, the mold having top and bottom plungers and means for actuating the same, one plunger composed of two parts which enter the mold, one part being connected to actuating means above and the other to actuating means below the mold, all combined substantially as described.

7. In a brick-pressing machine, the two molds in proximity, the cross-head and its plungers above the mold, the drop-box and its plungers below the mold, all plungers constructed to enter the mold one of the lower plungers having a casing connected by rods to the cross-head but capable of movement independently of said rods, all combined substantially as described.

8. In a brick-pressing machine, the combination of a mold, a lower plunger composed of sections, one section remaining in the mold and flush with the top thereof while the other section is withdrawn from the mold, and means for feeding bricks to, pressing them in, and removing them from said mold, all combined substantially as described.

9. In a brick pressing and re-pressing machine, the combination of the first mold and the second mold of different cross-sectional area, a top plunger for each mold and means for actuating said plungers, a bottom plunger for each mold and means for actuating these plungers simultaneously with the top plungers, mechanism for feeding the brick from the first to the second mold, and means for adjusting the initial position of the bottom plungers, all substantially as described.

In testimony whereof I have hereunto set my hand this 27th day of October, A. D. 1893.

THOMAS WHITTAKER.

Witnesses:
A. H. AICHEN,
J. W. CLAYTON.